United States Patent [19]

Groteke et al.

[11] 4,444,377

[45] Apr. 24, 1984

[54] MOLTEN METAL TRANSFER CRUCIBLE

[75] Inventors: Daniel E. Groteke, 1228 Ridge Cliff Rd., Cincinnati, Ohio 45215; Avery L. Kearney, Valparaiso, Ind.

[73] Assignee: Daniel E. Groteke, Cincinnati, Ohio

[21] Appl. No.: 398,406

[22] Filed: Jul. 14, 1982

[51] Int. Cl.³ .................................................. C21C 7/04
[52] U.S. Cl. .................................... 266/227; 266/239; 222/591; 222/603; 222/605; 222/629
[58] Field of Search ............... 266/238, 239, 272, 275, 266/218, 227; 75/13, 46; 164/335; 210/514, 515; 222/591, 603, 604, 605, 629

[56] References Cited

U.S. PATENT DOCUMENTS

| 361,352 | 4/1887 | Donovan | 222/605 |
|---|---|---|---|
| 3,050,794 | 8/1962 | Holz | 266/239 |
| 3,907,962 | 9/1975 | Ogiso | 266/227 |
| 4,024,056 | 5/1977 | Yarwood et al. | 266/227 |
| 4,113,241 | 9/1978 | Dore | 266/275 |
| 4,177,066 | 12/1979 | Clumpner | 266/227 |
| 4,277,281 | 7/1981 | Weber et al. | 266/227 |
| 4,298,192 | 11/1981 | Barbakadze et al. | 266/218 |
| 4,394,271 | 7/1983 | Groteke | 266/227 |

FOREIGN PATENT DOCUMENTS 40352 11/1981 European Pat. Off. ............ 222/603

OTHER PUBLICATIONS

"*Aluminum*", American Society for Metals, vol. III, 1967, p. 35.

*Primary Examiner*—M. J. Andrews
*Assistant Examiner*—Robert L. McDowell
*Attorney, Agent, or Firm*—Janine J. Weins; Michael J. Weins

[57] ABSTRACT

The improved crucible of the present invention both filters molten metal during the transfer of the molten metal from a supply receptacle such as a melting furnace to a receiving receptacle such as a mold. The transfer crucible of the present invention may be either portable or permanently mounted. The present invention relates to both the design of the improved transfer crucible and to the method for using the improved transfer crucible. The transfer crucible of the present invention is fitted with one or more removable blades, each of which contains a filter element. Molten metal can be filtered while the crucible is being filled with molten metal, during transfer of molten metal, or if desired molten metal can be filtered both on entry into and on exit from the transfer crucible.

7 Claims, 6 Drawing Figures

MOLTEN METAL TRANSFER CRUCIBLE

DESCRIPTION

1. Field of Invention

The present invention relates to an apparatus which filters and transfers molten metal, and to the method for using the apparatus.

2. Background Art

During automatic casting operations a crucible is frequently used to transport molten metal from a holding or refining furnace to the molds. Although an effort may be made to melt and transport molten metal that contains a minimum of impurities, the molten metal transported by a crucible to a mold will usually contains impurities which are detrimental to the resulting cast product. These impurities may include oxides of the metal, inclusions introduced by fluxes used during melting, or products formed by interaction of the molten metal with the furnace lining.

Techniques for removing impurities from the molten metal include filtering the molten metal in the holding or melting furnace, and/or placing a gate filter in the mold to filter the molten metal as it enters the mold. If the molten metal is filtered in the holding or melting furnace impurities may be picked up by the molten metal during transfer from the furnace to the crucible, and from the crucible to the mold. If a filter is placed in a mold gate excess superheat may be required, and/or the time to fill the mold may be excessive. Excess superheat can increase gas solubility in the molten metal and will increase the energy costs for the melting and casting operation.

SUMMARY OF INVENTION

The present invention provides an improved transfer crucible for transferring and filtering molten metal. Using the transfer crucible of the present invention molten metal can be filtered while being transferred from a holding or refining furnace to a mold or other appropriate receptacle.

The transfer crucible of the present invention is fitted with one or more removable blades. Each removable blade contains a filter element. Molten metal is filtered by passing through the filter element contained in the blade either while the crucible is being filled with molten metal, while molten metal is flowing from the crucible, or both during filling and emptying of the transfer crucible. During operation molten metal can be intermittently back-flushed through the filter element contained in the blade. Back-flushing molten metal through the filter element extends the useful life of the filter element, and thereby increases the hours the transfer crucible may be used between blade changes.

BEST MODES FOR CARRYING THE INVENTION INTO PRACTICE

Figure 1:
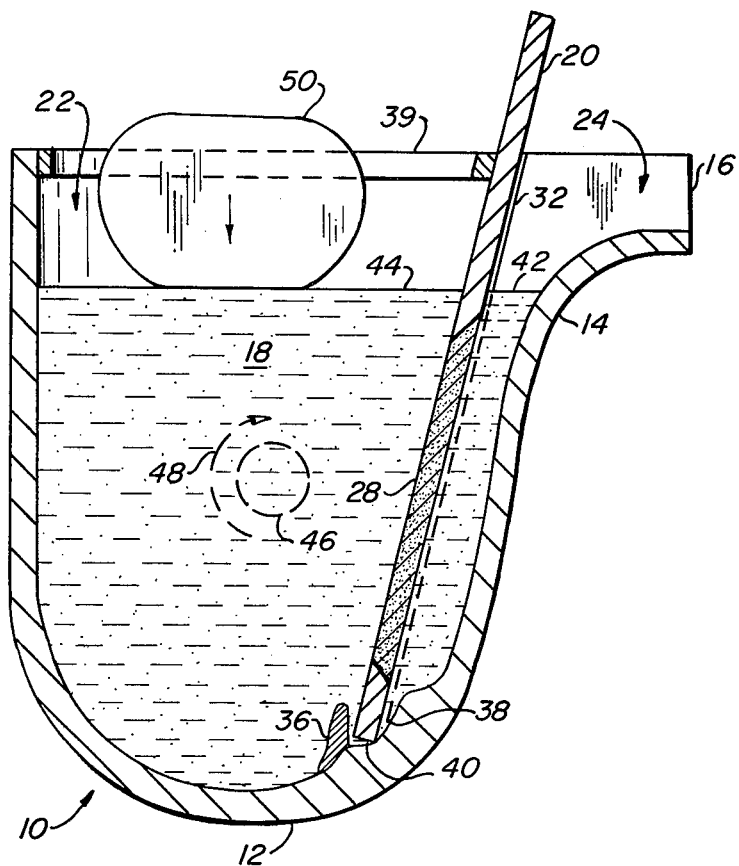
FIG. 1 is a schematic representation of one embodiment of the present invention in which a removable blade interrupts the path of molten metal flowing from the transfer crucible.

FIG. 1 shows one embodiment of the present invention. The transfer crucible 10 has a bottom 12, a sidewall 14 and a spout 16. The transfer crucible 10 is used to transfer molten metal 18. A removable blade 20 partitions the transfer crucible 10 into a first chamber 22, and a second chamber 24.

Figure 2:
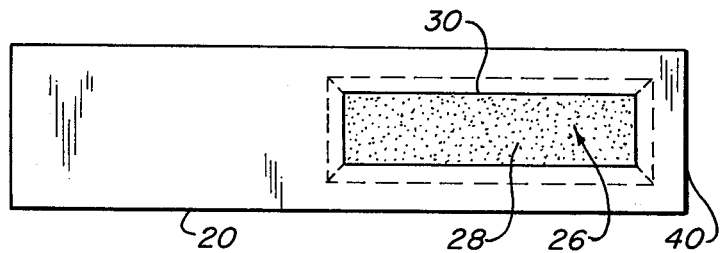
FIG. 2 is a schematic representation of the removable blade used in the transfer crucible of the present invention.

FIG. 2 is a schematic representation of the removable blade 20. The blade 20 has a passage 26 therethrough. A filter element 28 is cemented to the peripheral edge 30 of the passage 26. If the filter element 28 which fills the passage 26 will be subjected to large hydrostatic pressure, or if aluminum alloys with relatively high Si and Mg contents are to be filtered, it is recommended that the filter element be reinforced in accordance with the teachings of copending U.S. application Ser. No. 368,107 filed Apr. 14, 1982 of Daniel Edward Groteke entitled "PRE-WET AND REINFORCED MOLTEN METAL FILTER".

Figure 3:
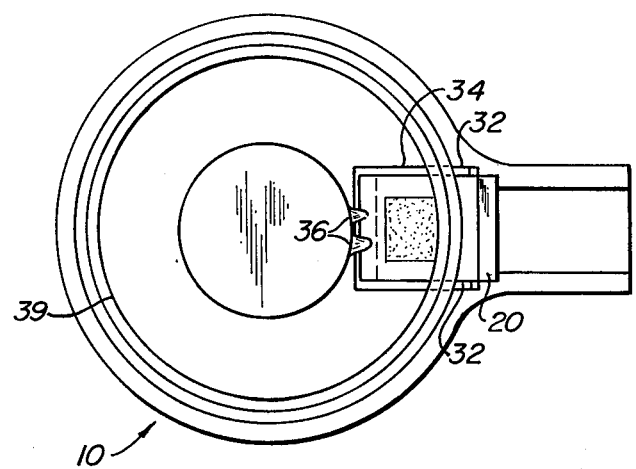
FIG. 3 is a schematic representation of a top view of the transfer crucible shown in FIG. 1. The removable blade containing the filter element interrupts the path of molten metal flowing from the transfer crucible.

FIG. 3 is a top view of the transfer crucible 10 shown in FIG. 1. The removable blade 20 resides in a side tracks 32 in a segment of the crucible wall 34. The removable blade 20 is given support by the side tracks 32 and by a blade retainers 36. As shown in FIG. 1 the blade retainer 36 extends up from the bottom 12 of the transfer crucible 10 and forms an interlock 38 which supports the base 40 of the blade 20. A resilient sealing means is used to affix the removable blade 20 to the side tracks 32 and to the blade retainer 36. Optionally a retainer ring 39 may be used to maintain the blade 20 affixed to the side tracks 32.

During operation molten metal from the second chamber 24 flows from the spout 16 of the transfer crucible 10 into a mold or other receptacle not shown. When the level of molten metal 42 in the second chamber 24 of the transfer crucible 10 is below the level of molten metal 44 in the first chamber 22, molten metal will flow through the filter element 28 contained in the replaceable blade 20 to replenish molten metal in the second chamber 24. When the level of molten metal 44 in the first chamber 22 drops below some predetermined level the quantity of molten metal 18 in the transfer crucible 10 is replenished by adding molten metal to the first chamber 22 of the transfer crucible 10.

The molten metal 18 can be caused to pass from the second chamber 24 and out the spout 16 by tilting the transfer crucible 10 about an axis 46 in the direction illustrated by the arrow 48, or optionally the crucible 10 may be pivoted about any other appropriately selected pivot point. Alternatively molten metal 18 may be forced out the spout 16 of the transfer crucible 10 by applying pressure to the surface 44 of the molten metal 18 in the first chamber 22 of the transfer crucible 10, or by the displacement of molten metal 18 in the first chamber 22 of the transfer crucible 10. Displacement of the molten metal 18 in the first chamber 22 can be accomplished by lowering a displacement element 50 into the molten metal 18 contained in the first chamber 22 of the transfer crucible 10, or by forcing a plunger not shown into the molten metal 18.

When the transfer crucible 10 is tilted about an axis, or when the molten metal contained in the first chamber 22 is displaced, molten metal will be forced from the first chamber 22 through the filter element 28 into the second chamber 24 and out the spout 16 into the selected receptacle.

When the pressure applied to the surface 44 of the molten metal contained in the first chamber 22 is reduced, or when the transfer crucible 10 is tilted in the direction counter to the arrow 48, hydrostatic pressure will cause molten metal from the second chamber 24 into the first chamber 22. Flowing molten metal from the second chamber 24 through the filter element 28 into the first chamber 22 will cause molten metal to back-flush through the filter element 28. Back-flushing molten metal through the filter element 28 will cause particulate to be dislodged from the pores of the filter element 28. Dislodging particulate by back- flushing molten metal through the filter element 28 will increase the useful life of the filter element 28, and thereby increase the hours that the transfer crucible 10 can be used between replacement of the blade 20.

Figure 4:
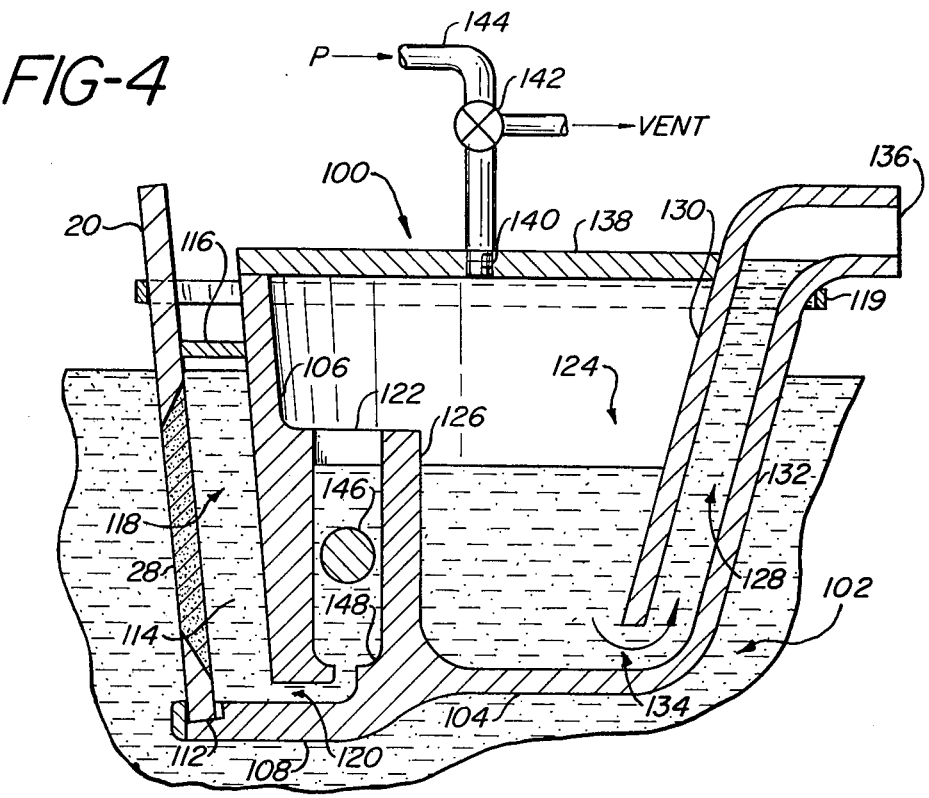
FIG. 4 is a schematic representation of a second embodiment of the present invention in which a removable blade containing a filter element interrupts the flow of molten metal into the transfer crucible. The flow of molten metal into and out of the transfer crucible is controlled by the appropriate application of pressure to the surface of the molten metal.

FIG. 4 is a schematic representation of a second embodiment of the present invention. The transfer crucible 100 is placed in a molten metal bath 102. The transfer crucible 100 has a bottom 104 and a sidewall 106. An extension 108 to the transfer crucible bottom 104 is provided. A groove 112 is cut in the extension 108. A removable blade 20 is secured in the groove 112 which is contained in the extension 108 by resilient sealing means. The sides of the removable blade 20 are secured to tracks 114 shown in FIG. 5 by resilient sealing means. The removable blade 20 is fitted with a filter element 28 as is illustrated in FIG. 2 and discussed above.

Figure 6:
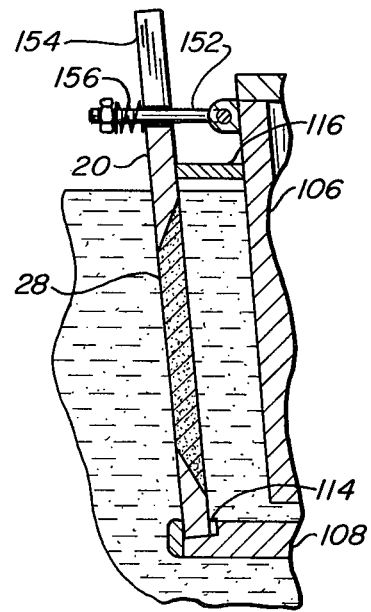
FIG. 6 is a schematic representation of a means for retaining the blade containing the filter element in contact with the transfer crucible.
Figure 5:
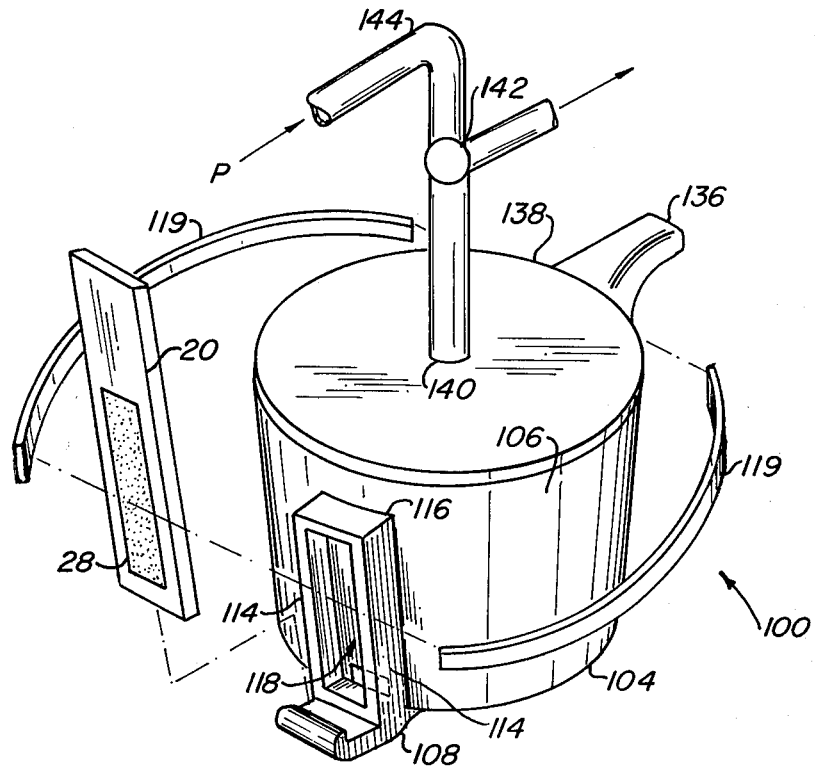
FIG. 5 is a schematic representation of an exploded prospectus of the embodiment of the present invention shown in FIG. 4.

A protrusion 116 from the sidewall 106 of the transfer crucible 100 is optionally provided. The protrusion 116, the extension 108, the tracks 114, the blade 20, and the transfer crucible sidewall 106 define an exterior molten metal chamber 118. A clamping means is provided to maintain the blade 20 in contact with the tracks 114, the protrusion 116 and the extension 108. The clamping means assures that any molten metal entering the exterior molten metal chamber 118 from the molten metal bath 102 must flow through the filter element 28. The clamping means may be a hoop 119 as shown in FIG. 5, a bolt 152 as shown in FIG. 6, or other appropriate means which will maintain the blade 20 in contact with the tracks 114, the protrusion 116 and the extension 108. When a bolt 152 is used a passage 154 should be made in the blade 20, and optionally a spring 150 can be provided to assure that the blade 20 will make a firm contact with the tracks 114, the protrusion 116 and the extension 108.

Filtered metal in the exterior molten metal chamber 118 enters the transfer crucible 100 by passing through an inlet opening 120 which is provided in the sidewall 106 of the transfer crucible 100.

The interior of the transfer crucible 100 is divided into three chambers. The first chamber 122 communicates with the inlet opening 120. The second chamber 124 is separated from the first chamber 122 by a baffle 126. Molten metal contained in the first chamber 122 must flow over the baffle 126 to enter the second chamber 124. The third chamber 128 is separated from the second chamber 124 by an interior pouring spout wall 130. The third chamber 128 is bounded by the interior pouring spout wall 130 and by the spout sidewall 132. Molten metal flows from the second chamber 124 into the third chamber 128 through a spout inlet passage 134 which is located at the base of the interior pouring spout wall 130. Molten metal flows from the third chamber 128 through a spout 136 into an appropriate receptacle not shown.

A crucible lid 138 seals the top of the transfer crucible 100. An inlet 140 is provided in the crucible lid 138. The inlet 140 can be opened, closed and/or bleed to the atmosphere by a valve 142. The valve 142 is connected to a pressure line 144. An inlet opening obstruction 146 may be provided in the first interior chamber 122.

During operation the valve 142 is opened allowing pressurized gas to flow through the inlet 140. The pressurized gas forces the molten metal to flow from the second chamber 124 into the third chamber 128 and out the spout 136; and causes both molten metal to flow out the inlet opening 120 into the exterior chamber 118 and the inlet opening obstruction 146 to seat on a seal 148 thereby blocking the inlet passage 120. Since the exterior molten metal chamber 118 is confined molten metal is forced into the exterior chamber 118 and forced to back flush through the filter element 28 contained in the removable blade 20 into the molten metal bath 102. Back flushing molten metal through the filter element 148 dislodges particulate and cleans the filter element. This periodic cleaning of the filter element greatly extends the useful life of the filter element and can extend the service time between changes of the removable blade 20.

If a minimum of impurities are required, or if the transfer crucible is used to transfer molten metal containing a large quantity of impurities it may be advantageous to combine the first and second embodiments of the present invention in such a manner that molten metal is filtered both on entering and leaving the transfer crucible. This can be accomplished by replacing a portion of the interior pouring spout wall 130 with a removable blade 20. Molten metal will flow from the second chamber 124 into the third chamber 128 by passing through the filter element 28 contained in the removable blade 20.

While the novel features of this invention have been described in terms of preferred embodiments and particular applications, it will be appreciated that various omissions and substitutions in form and in detail of the apparatus and method may be made by those skilled in the art without departing from the spirit of the invention.

What we claim:

1. An improved transfer crucible for containing molten metal, having a spout, and means for providing flow of molten metal through the spout, the improvement comprising:
    at least one removable blade positioned to divide the crucible into a first chamber, and a second chamber, said blade having a passage therethrough;
    a filter element positioned in said passage, said filter element positioned with respect to the crucible such that said filter element interrupts the flow of metal in a manner such that filtered metal flows from the spout of the transfer crucible;

a track in the sidewall of the crucible for positioning said blade; and a resilient seal placed between said track and said blade for affixing said blade.

2. An improved transfer crucible for containing molten metal, having an inlet opening, a spout, and means for providing flow of molten metal through the spout, the improvement comprising:

at least one removable blade having a passage therethrough, said blade being adjacent to said inlet opening;

a filter element positioned in said pasage said filter element positioned with respect to the crucible such that said filter element interrupts the flow of metal in a manner such that filtered metal flows from the spout of the transfer crucible;

a track in the sidewall of the crucible for positioning said blade; and a resilient seal placed between said track and said blade for affixing said blade.

3. The transfer crucible of claim 1 or 2 wherein a clamping means is used for holding said blade in contact with said resilient sealing means on said track.

4. The transfer crucible of claim 1 or 2 wherein said filter is attached to said passage with a refractory cement.

5. The transfer crucible of claim 4 wherein said filter element contained in said blade is reinforced.

6. The transfer crucible of claim 1 or 2 wherein said means for providing flow of molten metal through the spout is gas pressure applied to the surface of the molten metal.

7. The transfer crucible of claim 2 further comprising means for restricting reverse flow of molten metal through the molten metal inlet opening.

* * * * *